x`

(12) United States Patent
Fulks

(10) Patent No.: US 11,275,256 B2
(45) Date of Patent: *Mar. 15, 2022

(54) EYEGLASS RETAINER WITH EXTENSION

(71) Applicant: Clayton M. Fulks, Hendersonville, TN (US)

(72) Inventor: Clayton M. Fulks, Hendersonville, TN (US)

(73) Assignee: ANCHOR EYEWEAR HOLDING COMPANY LLC, Hendersonville, TN (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/707,595

(22) Filed: Dec. 9, 2019

(65) Prior Publication Data

US 2020/0110279 A1    Apr. 9, 2020

Related U.S. Application Data

(63) Continuation-in-part of application No. 15/981,158, filed on May 16, 2018, now Pat. No. 10,502,975.

(60) Provisional application No. 62/507,546, filed on May 17, 2017.

(51) Int. Cl.
　　*G02C 3/00*　　　(2006.01)
　　*G02C 5/22*　　　(2006.01)

(52) U.S. Cl.
　　CPC .......... *G02C 3/006* (2013.01); *G02C 5/2263* (2013.01)

(58) Field of Classification Search
　　CPC .......... G02C 5/14; G02C 3/003; G02C 3/006
　　USPC ........................... 351/123, 156, 157
　　See application file for complete search history.

(56) References Cited

U.S. PATENT DOCUMENTS

| 4,479,703 A | 10/1984 | Enghofer |
| 6,547,388 B1 | 4/2003 | Bohn |
| 6,905,206 B2 | 6/2005 | Skuro |
| 7,159,978 B2 | 1/2007 | Skuro |
| 10,502,975 B2 * | 12/2019 | Fulks ..................... G02C 5/143 |
| 2016/0025998 A1 | 1/2016 | Ruhland et al. |

* cited by examiner

*Primary Examiner* — Hung X Dang
(74) *Attorney, Agent, or Firm* — Bryan W. Bockhop; Bockhop Intellectual Property Law, LLC

(57) ABSTRACT

An eyeglass retainer system for use with eyeglasses worn by a user and having a frame front includes a pair of eyeglass temples. Each temple has a first end for securing the temple to frame front and defines a first channel passing therethrough that terminates in a first stopping mechanism. Extendable coupling units are slidably disposed in the first channels and terminate in a first stopper that is configured to engage the first stopping mechanism so as to prevent it from exiting the first channel completely. Two magnetic connectors are each affixed to a different one of the extendable coupling units and have opposite polarities so as to attract each other when placed against to each other. The coupling units are slid out of the first channel so that the two magnetic connectors can be coupled to each other behind the user's head so as to retain the eyeglasses.

12 Claims, 4 Drawing Sheets

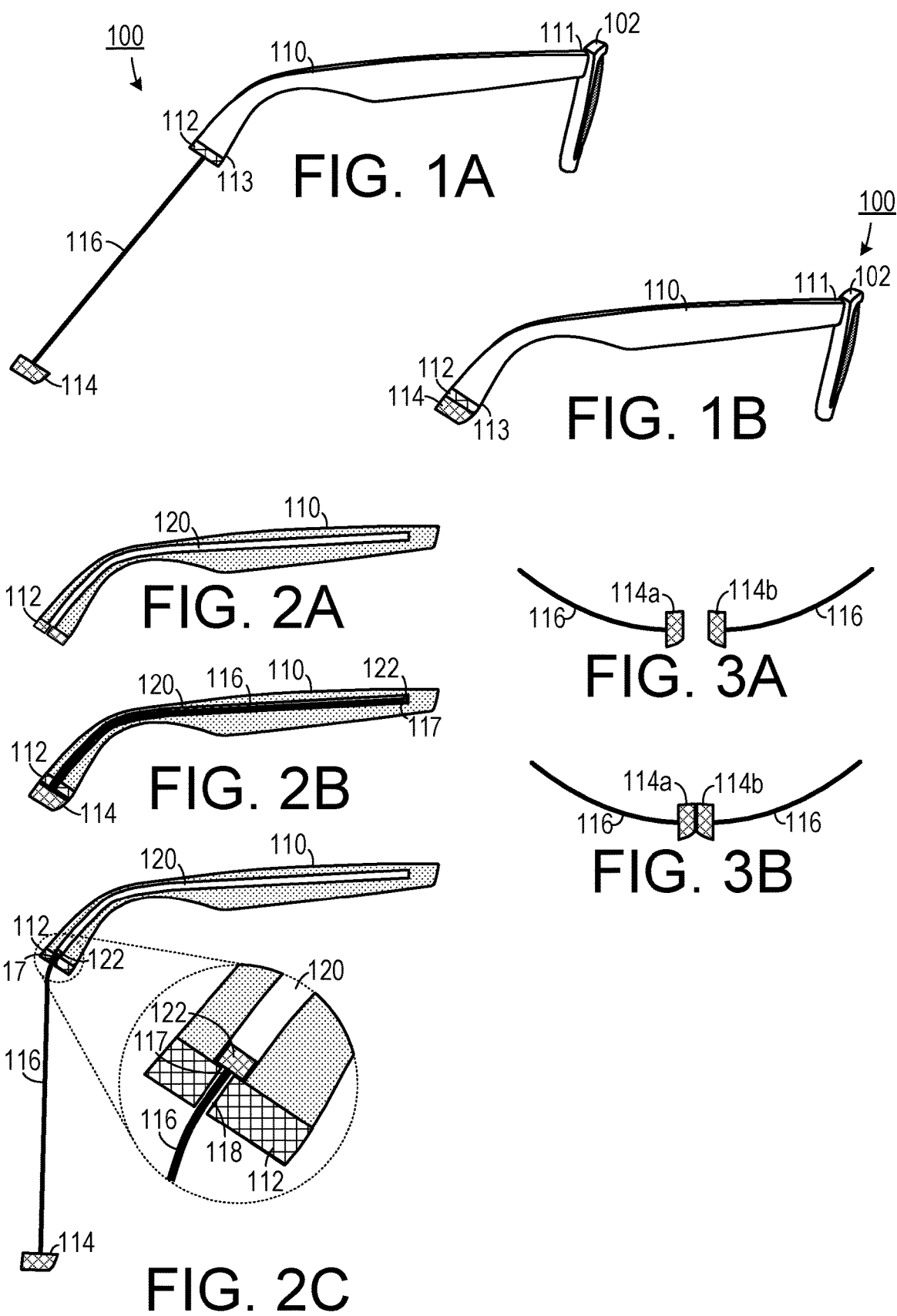

EYEGLASS RETAINER WITH EXTENSION

CROSS-REFERENCE TO RELATED APPLICATION(S)

This application is a continuation-in-part of, and claims the benefit of U.S. patent application Ser. No. 15/981,158, filed May 16, 2018 and now U.S. Pat. No. 10,502,975, issued on Dec. 10, 2019, which is a non-provisional of U.S. Provisional Patent Application Ser. No. 62/507,546, filed May 17, 2017, the entirety of both of which is hereby incorporated herein by reference.

BACKGROUND OF THE INVENTION

1. Field of the Invention

The present invention relates to eyeglass retainers and, more specifically, to an eyeglass retainer that is retractable.

2. Description of the Related Art

Eyeglass retainers are used by wearers of eyeglasses (typically sunglasses and reading glasses) to hold the eyeglasses suspended from the wearer's neck when the eyeglasses are not being worn. Typical eyeglass retainers include a cord or chain having loops at both ends to engage the temples of the eyeglasses. Such retainers remain in view even when the eyeglasses are being worn by the user, which some users feel can be unsightly or unfashionable.

Several eyeglass retainers that are hidden when the eyeglasses are being worn have been proposed. Such retainers typically employ spring-loaded take-up reels hidden in a hollowed-out portion of one or more of the temples. The retainer is pulled out when the user desires its use and then pushed back in when the eyeglasses are to be worn. Such proposed retainers have not been widely produced because they require complex mechanical systems that add weight and bulk to the temples, and that add cost to the eyeglasses.

Therefore, there is a need for a mechanically simple eyeglass retainer system.

SUMMARY OF THE INVENTION

The disadvantages of the prior art are overcome by the present invention which, in one aspect, is an eyeglass retainer system for use with eyeglasses having a frame front that includes a pair of eyeglass temples. Each temple has a first end for securing the temple to frame front and an opposite second end. Each temple defines an elongated channel passing therethrough and opening to the second end. Two cords are each disposed within the channel defined by a different one of the temples and extend out from the second end. Each chord is extendable from the channel and retractable into the channel. Two magnetic connectors are each affixed to a different one of the cords. The two magnetic connectors have opposite polarities so as to attract each other when placed against to each other. A stopping mechanism prevents the chord from exiting the hole completely.

In another aspect, the invention is an eyeglass retainer system for use with eyeglasses having a frame front that includes a pair of eyeglass temples. Each temple has a first end for securing the temple to frame front and an opposite second end. Each temple defines an elongated channel passing therethrough and opening to the second end. Two cords are each disposed within the channel defined by a different one of the temples and extend out from the second end. Each chord is extendable from the channel and retractable into the channel. Two magnetic connectors are each affixed to a different one of the cords. The two magnetic connectors have opposite polarities so as to attract each other when placed against to each other. Two magnetic holding pieces are each affixed to the second end of a different one of the temples. Each holding piece defines a hole that is contiguous with the channel passing therethrough. The magnetic holding pieces are configured to attract the magnetic connectors when placed adjacently thereto. A stopper is affixed to a distal end of the cord and that has a diameter. A hole is defined by the magnetic holding piece. The hole has a diameter that is smaller than the diameter of the stopper.

In another aspect, the invention is an eyeglass retainer system for use with eyeglasses having a frame front and a pair of eyeglass temples in which each temple has a first end hingedly secured to the frame front and an opposite second end. Two cords each have a proximal end and an opposite distal end. An attachment mechanism selectively secures the proximal end of each cord to a different second end of each temple. Two magnetic connectors are each affixed to the distal end of a different one of the cords. The two magnetic connectors are configured to be secured to each other by magnetic attraction.

In another aspect, the invention is an eyeglass retainer system for use with eyeglasses worn by a user and having a frame front that includes a pair of eyeglass temples. Each temple has a first end for securing the temple to frame front and an opposite second end. Each temple defines a first channel passing therethrough and opens to the second end and terminating in a first stopping mechanism. Two extendable coupling units are each slidably disposed in a different one of the first channels. Each extendable coupling unit terminates in a first stopper that is configured to engage the first stopping mechanism so as to prevent each extendable coupling unit from exiting the first channel completely. Two magnetic connectors are each affixed to a different one of the extendable coupling units. The two magnetic connectors have opposite polarities so as to attract each other when placed against to each other. The two extendable coupling units are configured to be slid out of the first channel so that the two magnetic connectors can be coupled to each other behind the user's head so as to retain the eyeglasses.

In yet another aspect, each extendable coupling unit includes a tubular member having a first end and a second end. A portion of the tubular member is slidably disposed within the first channel and the second end is affixed to one of the magnetic connectors. The tubular member defines a second channel therein. The first end of the tubular member terminates in a second stopping mechanism. A cord is slidably disposed within the second channel and has a proximal end that terminates in the first stopper and a distal end that terminates in a second stopper. The first stopper is configured to engage the first stopping mechanism of the temple so as to maintain a portion of the cord within the first channel. The second stopper is configured to engage the second stopping mechanism of the tubular member so as maintain a second portion the cord within the second channel when a portion of the tubular member is slid out of the first channel and a portion of the cord is slid out of the second channel. Two magnetic connectors are each affixed to a different one of the extendable coupling units. The two magnetic connectors have opposite polarities so as to attract each other when placed against to each other. The two extendable coupling units are configured to be slid out of the first channel so that the two magnetic connectors can be coupled to each other behind the user's head so as to retain the eyeglasses.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1A is a side view of one embodiment of a pair of eyeglasses that includes a retainer in an extended state.

FIG. 1B is a side view of the embodiment shown in FIG. 1B in which the retainer is in a retracted state.

FIGS. 2A-2C are cut-away schematic views of a temple member employing the embodiment shown in FIGS. 1A-1B.

FIG. 3A-3B are schematic diagrams that illustrate use of the magnetic connectors.

DETAILED DESCRIPTION OF THE INVENTION

Figure 4A:
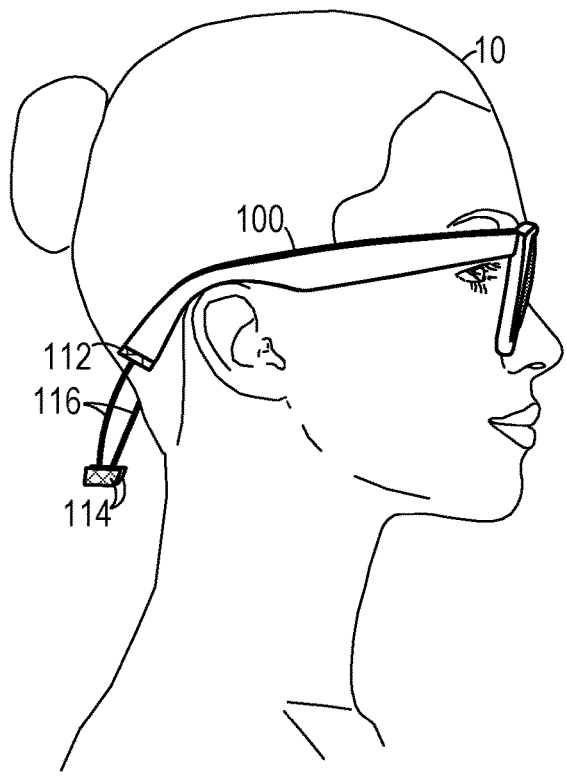
FIG. 4A-4B are schematic diagrams that illustrate a retainer system in use.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, one embodiment of an eyeglass retainer system 100 includes a pair of eyeglasses that have a frame front 102 and a pair of temples 110 secured thereto. Each temple 110 has a first end 111 hingedly secured to the frame front 102 and an opposite second end 113. Each temple member 110 includes a retractable cord 116 (which could include: a traditional fiber cord, a metal cable, a plastic cable, a silicon cord, a leather cord, a sailing rope, and combinations thereof) that is terminated by a magnetic connector 114. When the cord 116 is retracted, as shown in FIG. 1B, the magnetic connector 114 is held in place with a complementary magnetic holding piece 112 (which could be a non-magnetic ferrous metal or a magnet) that is affixed to the end of the temple member 110, thereby giving the appearance of normal eyeglasses. In an alternate embodiment, the magnetic connector 114 could be held against the second end 113 by an extension of the temple 110 that clicks into a notch in the magnetic connector 114. The temple members 110 can be made from any materials commonly used in making eyeglass temples (including plastics, metals, etc.) and can be made from any process known in the art of manufacturing eyeglass temples (including injection molding, machining, etc.).

As shown in FIGS. 2A-2C, the temple member 110 defines an internal channel 120 that receives the cord 116, having a distal end 117, therein. The distal end 117 of the cord 116 that is opposite from the magnetic connector 114 terminates in a stopper 122 that is larger than a restriction near the end of the temple member 110. The restriction can take the form, for example, of the channel 120 narrowing as it passes through the magnetic holding piece 112 or it could be in the form of a detent (not shown) that is integrally formed in the temple member 110 or a hole 118 that has a smaller diameter than that of the stopper 122 so that the cord 116 is prevented from fully exiting the channel 120.

As shown in FIGS. 3A-3B, in using the retainer system, the cords 116 are pulled out from the channels defined by each temple member and the magnetic connectors 114a and 114b are placed together. The polarity of magnetic connector 114a is opposite that of magnetic connector 114b to cause them to be held together. In embodiments designed for use in highly active environments, the magnetic connectors 114 include rare earth magnets to insure secure holding. In embodiments designed for use in less active environments, less powerful magnets may be used. The magnetic connectors 114 can be rubberized or plasticized to provide a better gripping surface and surface texture can be added to the connectors 114 to facilitate gripping.

Figure 4B:
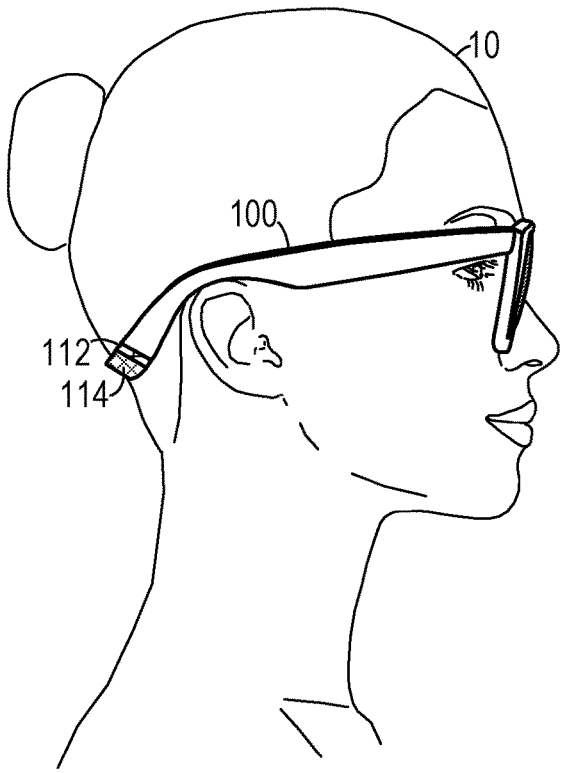

A person 10 wearing the retainer system 100 with the cords 116 employed is show in FIG. 4A. The retainer system 100 with the cords hidden is show in FIG. 4B.

Figure 5:
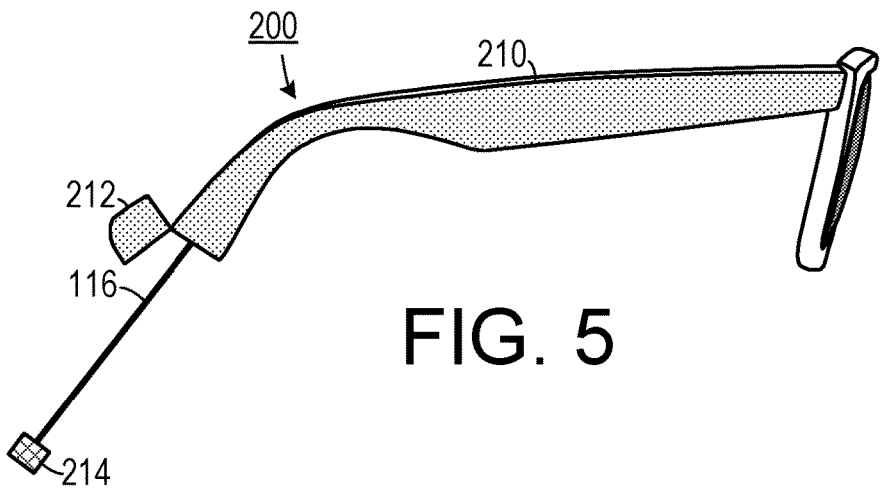
FIG. 5 is a schematic diagram of a second embodiment of a retainer system.

As shown in FIG. 5, one embodiment of a retainer system 200 employs a temple member 210 that terminates with a hinged end cap 212 into which fits the magnetic connector 214 when not in use. This embodiment can provide a somewhat more natural look in certain configurations. In other embodiments, the end cap can be fitted with a sliding door through which the connector can exit. Also, a sliding lock can be used to allow the cord to be removed completely from the temple member.

Figure 6:
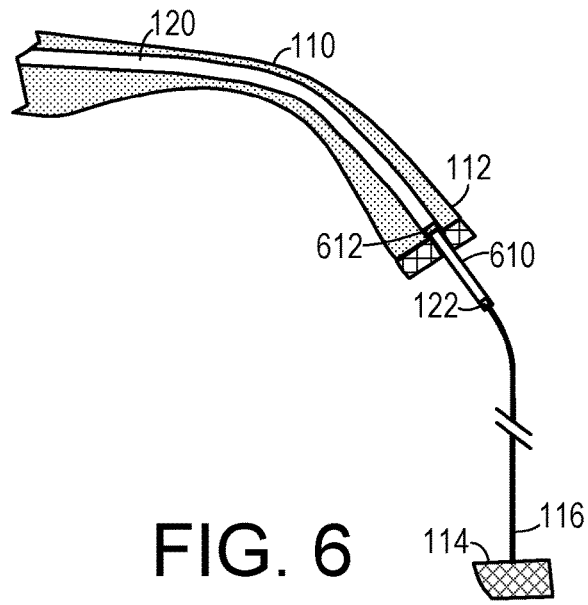
FIG. 6 is a schematic diagram of an embodiment for extending the cord length.
Figure 7:
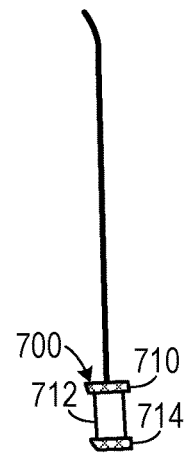
FIG. 7 is a schematic diagram of a second embodiment for extending the cord length.

As shown in FIG. 6, the temple member 110 can be fitted with a tubular extender 610 that fits into the channel 120 and that has an end stop 612. The cord 116 fits into the tubular extender 610. When the cord 116 is pulled out of the channel 120, the extender is also pulled out, thereby lengthening the effective reach of the cord 116. In the alternative, the effective reach can be accomplished by placing extended connectors 700 at the end of one or both of the cords. An extended connector 700 would include a first magnet 710 that is attachable to the magnetic holding piece 112, a spacer 712 and a magnetic connector 714 affixed to the spacer 712.

Figure 8A:
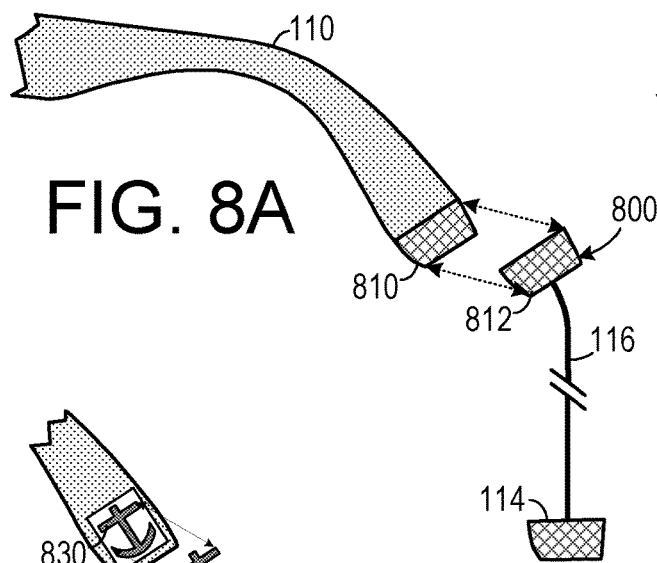
FIGS. 8A-8C are schematic diagrams of an embodiment that can be applied to existing glasses.
Figure 8B:
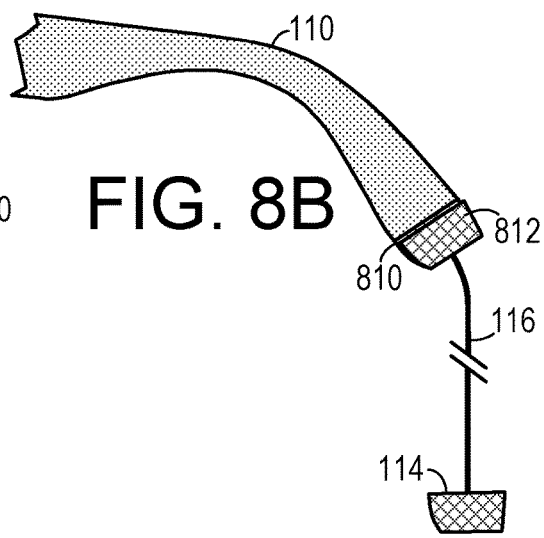
Figure 8C:
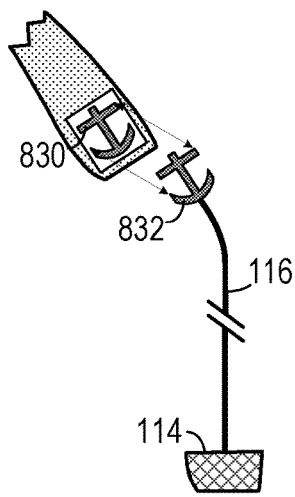

One embodiment of a retainer strap can be used for any sunglasses. It includes a self-adhesive magnet that affixes to the terminal end of the temple arm to any sunglasses. (Alternately, the magnet can be glued or attached to the temple with a fastener.) The strap/cable consists of a similar magnet, but a "female version" for secure connection in the same angulation every time and the same terminal magnet as my other sunglasses for magnetic connection in the back. These straps can be made out of one of many different materials, including but not limited to: cable, metal, plastic, monofilament, rope, sailing rope, leather, silicone, nylon, neoprene, etc. They can also be made to different lengths. In this embodiment, which is shown in FIGS. 8A and 8B, an attachable unit 800 can be employed for use with existing glasses. The attachable unit 800 includes a magnetic tab 810 that can be affixed to an existing temple 110 (e.g., with a pressure sensitive adhesive previously applied to the magnetic tab 810). The cord 116 has an end magnet 812 for attachment to the magnetic tab 810. As shown in FIG. 8C, the tab can define a recessed shape 830 and the end magnet 832 can have a shape that is complementary to the recessed shape 830 so that at least a portion of which will fit therein, thereby facilitating more positive engagement. The cords can be offered in multiple sizes to accommodate the preferences of different users. For example, some users might prefer a 10" cord length, others might prefer a 12" cord length, while others might prefer a 14" cord length.

Figure 9:
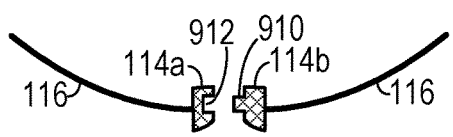
FIG. 9 is a schematic diagram of complementary connectors.

In one embodiment, as shown in FIG. 9, the magnetic connectors 114a and 114b can be fit with complementary shapes 910 and 912 (such as a protuberance and an indentation that is complementary in shape to the protuberance, as shown) that ensure more positive engagement.

Figure 10A:
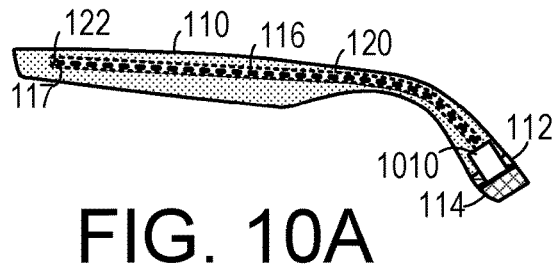
FIGS. 10A-10B are schematic diagrams of an embodiment that include a cord release mechanism.
Figure 10B:
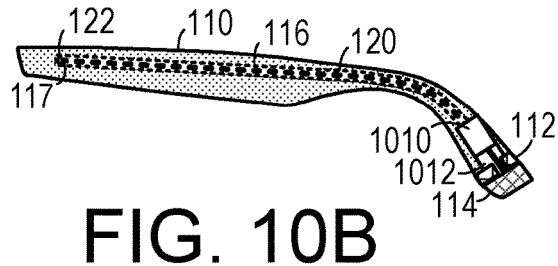
Figure 11A:
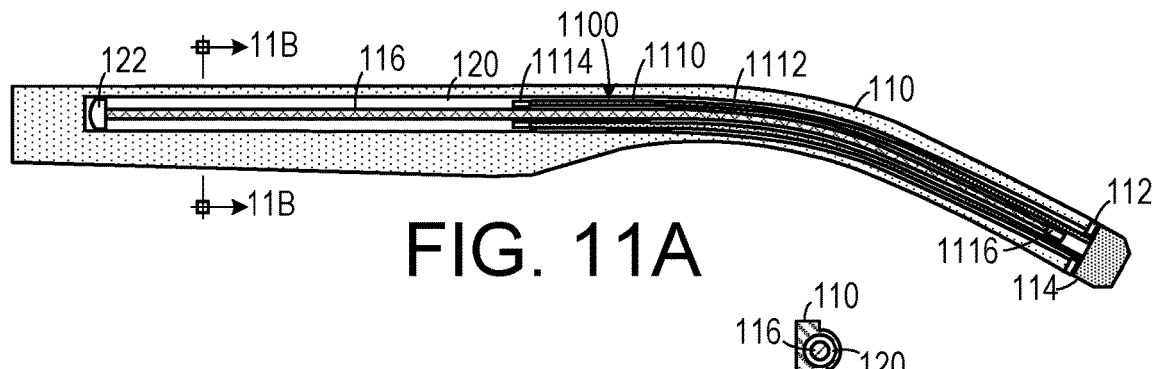
FIG. 11A is a schematic diagram of an embodiment of one temple with an extension.
Figure 11B:
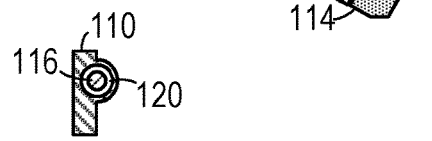
FIG. 11B is a cross section of the embodiment shown in FIG. 11A, taken along line 11B-11b.
Figure 12A:
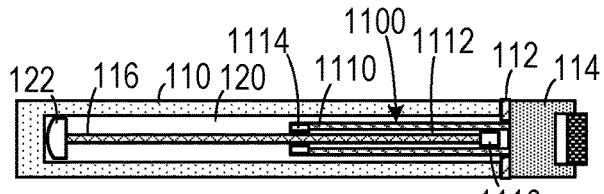
FIGS. 12A-12C is a series of schematic diagrams showing the telescoping of the extension.
Figure 12B:
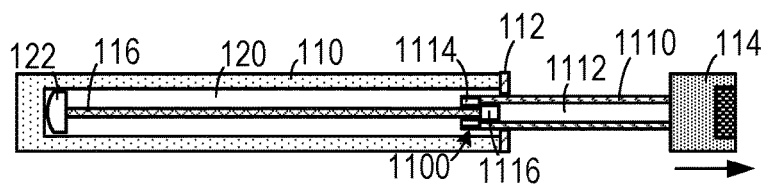
Figure 12C:
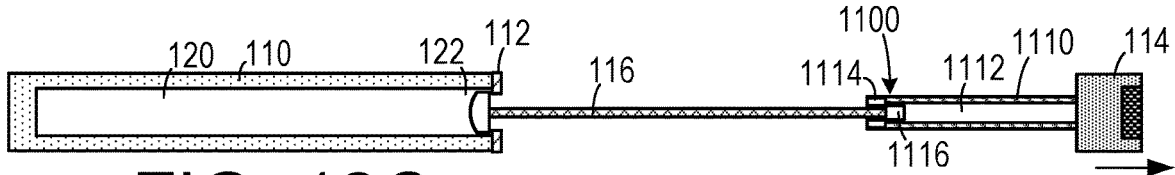

As shown in FIGS. 10A and 10B, one embodiment can include a release mechanism that allows removal and replacement of the cords 116. The embodiment shown, includes a slidable door 1010 that has a closed position (shown in FIG. 10A) and an open position (shown in FIG. 10B) that exposes a hole 1012 that is large enough to allow the stopper 122 to exit the channel 120. As will be readily appreciated by those of skill in the art, many other cord release mechanisms can be employed. This embodiment could allow the switching out of cords of different colors and textures.

In one embodiment, as shown in FIGS. 11A-11B and 12A-12C, telescoping extendable coupling units 1100 can be employed to extend the length of the cords 116. Each telescoping unit can include a tubular member 1110 that is slidably disposed within the first channel 120 of each temple 110. An end of the each tubular member 1110 is affixed to one of the magnetic connectors 1114. The tubular member 1110 defines a second channel 1112 therein. The first end of the tubular member 1110 terminates in a second stopping mechanism 1114. The cord 116 is slidably disposed within the second channel 1112 and terminates at one end in a first stopper 122. The opposite end terminates in a second stopper 1116. As the extending coupling unit 1110 is pulled out of the first channel 120, the first stopper 122 engages the first stopping mechanism 112 so as to maintain a portion of the cord 116 within the first channel 120. The second stopper 116 engages the second stopping mechanism 1114 of the tubular member 1110 so as maintain a portion the cord 116 within the second channel 1112. This embodiment provides extended length for the retainer system so as to provide greater comfort for the wearer.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An eyeglass retainer system for use with eyeglasses worn by a user and having a frame front, comprising:
    (a) a pair of eyeglass temples, each temple having a first end for securing the temple to frame front and an opposite second end, each temple defining a first channel passing therethrough and opening to the second end and terminating in a first stopping mechanism;
    (b) two extendable coupling units in which each of the extendable coupling units is slidably disposed in a different one of the first channels, each extendable coupling unit terminating in a first stopper that is configured to engage the first stopping mechanism so as to prevent each extendable coupling unit from exiting the first channel completely; and
    (c) two magnetic connectors, each of the magnetic connectors affixed to a different one of the extendable coupling units, the two magnetic connectors having opposite polarities so as to attract each other when placed against to each other,
        wherein the two extendable coupling units are configured to be slid out of the first channel so that the two magnetic connectors can be coupled to each other behind the user's head so as to retain the eyeglasses.

2. The eyeglass retainer system of claim 1, wherein the magnetic connectors are shaped so as to be contiguous with the temples.

3. The eyeglass retainer system of claim 1, wherein the magnetic connectors each comprise rare earth magnets.

4. The eyeglass retainer system of claim 1, further comprising a cap hingedly attached to the second end of each temple, wherein each magnetic connector is configured to fit inside a void defined by the channel and the cap when the cap is closed against the second end of the temple.

5. An eyeglass retainer system for use with eyeglasses worn by a user and having a frame front, comprising:
    (a) a pair of eyeglass temples, each temple having a first end for securing the temple to frame front and an opposite second end, each temple defining a first channel passing therethrough and opening to the second end and terminating in a first stopping mechanism;
    (b) two extendable coupling units in which each of the extendable coupling units is slidably disposed in a different one of the first channels, each extendable coupling unit terminating in a first stopper that is configured to engage the first stopping mechanism so as to prevent each extendable coupling unit from exiting the first channel completely;
    (c) two magnetic connectors, each of the magnetic connectors affixed to a different one of the extendable coupling units, the two magnetic connectors having opposite polarities so as to attract each other when placed against to each other, wherein the two extendable coupling units are configured to be slid out of the first channel so that the two magnetic connectors can be coupled to each other behind the user's head so as to retain the eyeglasses;
    (d) a tubular member having a first end and a second end, a portion of the tubular member being slidably disposed within the first channel, the second end affixed to one of the magnetic connectors, the tubular member defining a second channel therein, the first end of the tubular member terminating in a second stopping mechanism; and
    (e) a cord slidably disposed within the second channel having a proximal end that terminates in the first stopper and a distal end terminates in a second stopper, the first stopper configured to engage the first stopping mechanism of the temple so as to maintain a portion of the cord within the first channel, the second stopper configured to engage the second stopping mechanism of the tubular member so as maintain a second portion the cord within the second channel when a portion of the tubular member is slid out of the first channel and a portion of the cord is slid out of the second channel.

6. The eyeglass retainer system of claim 5, wherein the magnetic connectors are shaped so as to be contiguous with the temples.

7. The eyeglass retainer system of claim 5, wherein the magnetic connectors each comprise rare earth magnets.

8. The eyeglass retainer system of claim 5, further comprising a cap hingedly attached to the second end of each temple, wherein each magnetic connector is configured to fit inside a void defined by the channel and the cap when the cap is closed against the second end of the temple.

9. An eyeglass retainer system for use with eyeglasses worn by a user and having a frame front, comprising:
   (a) a pair of eyeglass temples, each temple having a first end for securing the temple to frame front and an opposite second end, each temple defining a first channel passing therethrough and opening to the second end and terminating in a first stopping mechanism;
   (b) two extendable coupling units in which each of the extendable coupling units is slidably disposed in a different one of the first channels, each extendable coupling unit terminating in a first stopper that is configured to engage the first stopping mechanism so as to prevent each extendable coupling unit from exiting the first channel completely, wherein each extendable coupling unit includes:
      (i) a tubular member having a first end and a second end, a portion of the tubular member slidably disposed within the first channel, the second end being affixed to one of the magnetic connectors, the tubular member defining a second channel therein, the first end of the tubular member terminating in a second stopping mechanism; and
      (ii) a cord slidably disposed within the second channel having a proximal end that terminates in the first stopper and a distal end terminates in a second stopper, the first stopper configured to engage the first stopping mechanism of the temple so as to maintain a portion of the cord within the first channel, the second stopper configured to engage the second stopping mechanism of the tubular member so as maintain a second portion the cord within the second channel when a portion of the tubular member is slid out of the first channel and a portion of the cord is slid out of the second channel; and
   (c) two magnetic connectors, each of the magnetic connectors affixed to a different one of the extendable coupling units, the two magnetic connectors having opposite polarities so as to attract each other when placed against to each other, wherein the two extendable coupling units are configured to be slid out of the first channel so that the two magnetic connectors can be coupled to each other behind the user's head so as to retain the eyeglasses.

10. The eyeglass retainer system of claim 9, wherein the magnetic connectors are shaped so as to be contiguous with the temples.

11. The eyeglass retainer system of claim 9, wherein the magnetic connectors each comprise rare earth magnets.

12. The eyeglass retainer system of claim 9, further comprising a cap hingedly attached to the second end of each temple, wherein each magnetic connector is configured to fit inside a void defined by the channel and the cap when the cap is closed against the second end of the temple.

* * * * *